Patented Jan. 13, 1942

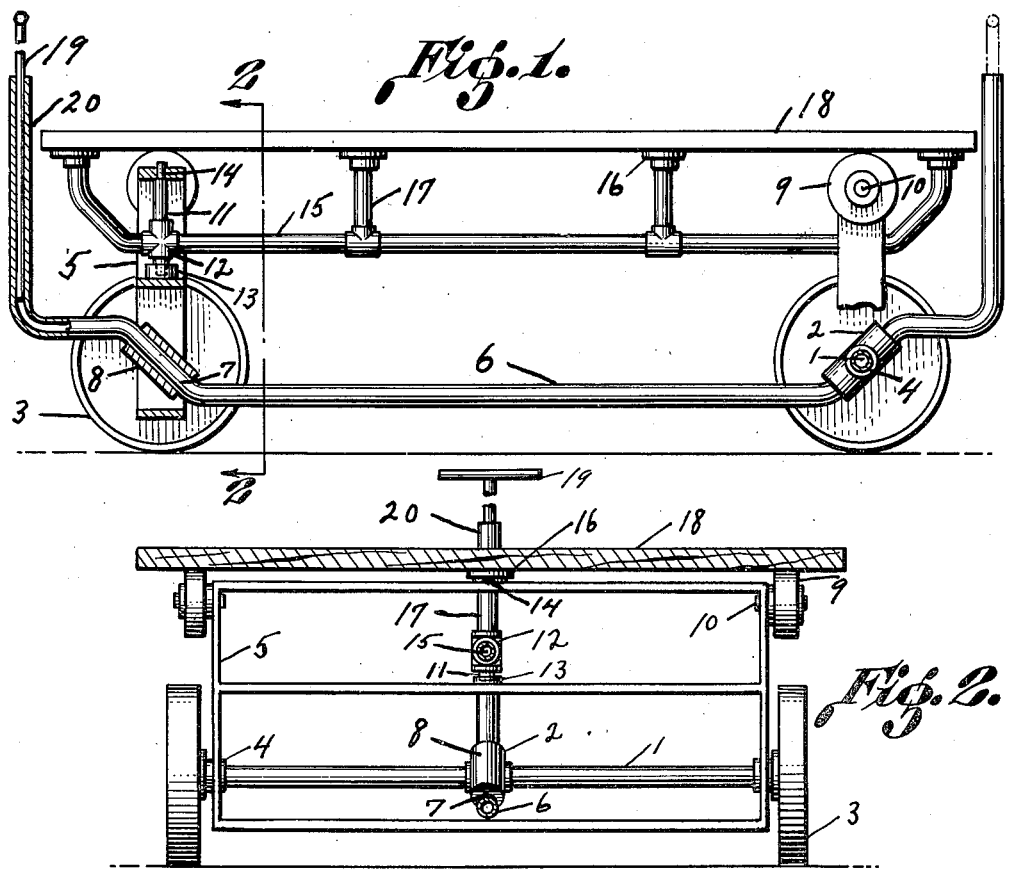

2,269,910

UNITED STATES PATENT OFFICE 2,269,910

STEERING CONTROL SYSTEM FOR MANUALLY OPERATED FOUR WHEEL VEHICLES

John C. Naab, Pendleton, Oreg., assignor of one-half to August Naab, Indianapolis, Ind.

Application March 18, 1939, Serial No. 262,657

1 Claim. (Cl. 280—48)

The present invention relates to improvements in steering mechanism for various types of hand propelled four wheel vehicles or their equivalents, of which commercial floor trucks, platform type trucks, baggage trucks, juvenile vehicles, baby carriages, vendor's wagons, recreational vehicles, shop trucks, store trucks, and various other types of hand operated four wheel industrial and commercial service wagons and carts are examples.

The advantages of my proposed construction for such vehicles, incorporating a unique design of flexible, positive, centrally controlled running gear will be apparent, eliminating as it does, a great deal of the first cost of construction, as well as the often unresponsive, uncertain action of casters in operation, with the advantage of a definite, sensitively responsive, positive control of vehicle travel direction, within wide or narrow margins, in marked contrast to the previous limited precision of control, and the common difficulty of steering many such loaded hand propelled vehicles equipped with casters by acting thru the entire body and load of the vehicle rather than applying, as here, the considerable less energy and effort required by the use of a steering system acting easily, exclusively and independently, mechanically, direct on the entire running gear alone, leaving the greater part of the operator's energy to be applied to propulsion itself, rather than as formerly, devoting much of it of necessity to directional wrestling with the loaded vehicle.

This advantage given makes for speedier possible change of travel direction and resultant better maneuvering around the obstacles in the path of travel, and also enables the operator to control the vehicle to much better advantage while working same on sloping surfaces where castered vehicles are all subject continually to the drift of gravity.

Other advantages of my direct, exclusive, independent control of vehicle steering as applied to manually operated vehicles of the four wheel type will suggest themselves to the observer as the specification proceeds, outlining the method used of simultaneously controlling the wheels of the vehicle in pairs with their entire axles, oppositely, thru the action of a single, common, centrally placed, axle intersecting and interconnecting longitudinal rotative steering control member in positive mechanical engagement with the free swinging axle or axles supporting the vehicle, the method being available for either single or double axle steering, preferably the latter, and in either case the axle positions are delicately altered by a light single-hand movement of the controlling handle in the direction of the desired turn as the result of the angular transmission design in the primary steering control member at the point or points where it passes thru the axle or axles, acting in opposing directions on the axles, producing double axle steering effect as graphically outlined in my drawing submitted herewith in further explanation.

Referring to said drawing, Fig. 1 shows a side elevation of the invention as applied in the preferred double installation, on both sets of wheels of the vehicle, showing the relationship of the primary steering member to the whole, while Figure 2 is a cross section of the vehicle on the line of 2—2 indicated in Figure 1, with similar numerals applying to similar parts in both presentations of an application of my invention in a practical working embodiment of the bare essentials shown in Fig. 3 and Fig. 4.

Fig. 3 is a simple line drawing showing the position taken by the running gear in making an extreme left turn from the centered position shown in Fig. 1 and Fig. 2; with Fig. 4 showing the same basic components in the position of making an extreme right turn from the center position, both axles responding simultaneously in opposed directions as the handle is moved in the direction of the desired turn, turning the vehicle in such direction from just a slight turn, to as much as a square turn of 90 degrees, instantly, if it is desired to make a sharp turn around an obstacle or around a corner along the route of travel.

The detailed reference numbers from 1 to 20, apply as follows to essential parts of the invention as outlined in the above mentioned drawing:

No. 1 indicates a free, wheel supported swinging supporting and steering axle, equipped midway between its supporting wheels with a transverse housing designated as No. 2, which housing carries a bearing, preferably a roller bearing, designated as No. 8 in which is accommodated No. 7, being an oblique section of the full length longitudinal primary steering control rod or tube No. 6, interconnecting the axles in the said preferable double installation shown, passing thru said axles at right angles as viewed from above, and at an angle of 45 degrees as viewed from the side, ranging outward and upward toward the end of the vehicle for the length of the oblique section No. 7, the shape of this section being the means and method of my conversion of the rotative steering movement of No. 6 into the radial steering movement of the swinging axles No. 1 by a lateral motion of the former.

The said steering rod controlled swinging axle No. 1 carries superimposed on free bearings indicated as No. 4, a rectangular intermediate superstructure supporting truss No. 5, serving to support the vehicle body No. 18 on the four rollers No. 9, revolving on stub axles No. 10 set into the upper edge of said superstructure supporting truss No. 5, thus contacting the underside of No. 18 in uniform free moving radial support in the manner of a fifth wheel throughout the range of rotation allowed the swinging steering axle or axles with the related intermediate companion members superimposed thereon.

The said intermediate supporting truss No. 5 carries further, inbuilt in central position, the pivotal king bolt No. 11, retained vertically in the lower king bolt retaining socket No. 13 and the upper king bolt retaining socket No. 14, surrounded by king bolt bearing No. 12, which in turn leads to solidly fixed anchorage thru its horizontal extensions No. 15, joining with the vertical co-extensions No. 17 leading into the fixed anchorage plates No. 16, thereby providing fixation for the said pivotal center occupied by king bolt No. 11, interconnecting, in workable manner, the running gear and the serviceable carrying body of the vehicle in all positions, and under all loads upon wheels No. 3.

The interchangeable steering handle No. 19, fitting into socket No. 20 at either end of the longitudinal steering member No. 6, upturning to a vertical position at the ends of the vehicle for control, controls the steering operation at either end of the vehicle, and with pushing operation of the vehicle, is always out of the way at the leading end of the vehicle, avoiding interference with adjacent objects at the turns, as will be understood by a closer study of the line drawings Figs. 3 and Fig. 4 showing turning positions.

The double end control construction shown in my illustration does not necessarily cover the entire possible structural arrangement of this phase of the invention, as the controlling handle may be operated from one end alone, on either one or both sets of wheels, and it is possible to operate the entire control from a mid-vehicle position thru the superstructure floor, as might be preferable in certain applications of the invention, likewise it would be possible to operate more than two basic units in tandem connected articularly with a universal joint in the controlling steering member between units.

Various other possible structural arrangements are possible differing from the submitted drawing without departing from the spirit of the invention, i. e. the swinging control of the axle or axles with their supporting wheels thru a single central inter-member transmission of steering effort applied to a single rotative common steering control.

Having thus described my invention, what I claim as new and seek to protect by Letters Patent is:

In a manually operated four wheel vehicle having a transverse swinging supporting axle structure for steering the vehicle; a centrally positioned, generally longitudinally extending rotative, hand controlled steering member having an angularly extending section intersecting such swinging transverse supporting axle structure normally at right angles thereto; a bearing member movably incorporated in the said transverse swinging axle structure for rotatably engaging the said angularly extending section of the intersecting longitudinal steering control member; said rotatively free, transversely mounted. thus intersected bearing member being so related thereto, and so co-acting thus therewith that right or left rotative movement of the said intersecting longitudinal steering control member imparts a resulting controlled swinging movement to the intersected transverse supporting axle structure for steering the vehicle in like directions.

JOHN C. NAAB.